United States Patent Office 3,467,190
Patented Sept. 16, 1969

3,467,190
ADJUSTING SALINITY TO ACHIEVE LOW INTERFACIAL TENSION BETWEEN AQUEOUS AND HYDROCARBON PHASES
Peggy M. Dunlap and Carl F. Brandner, Dallas, Tex., and Harold L. Townsend, Webster Groves, Mo., assignors to Mobil Oil Corporation, a corporation of New York
No Drawing. Filed Oct. 9, 1967, Ser. No. 673,954
Int. Cl. E21b 47/00, 43/20
U.S. Cl. 166—252          5 Claims

ABSTRACT OF THE DISCLOSURE

This specification discloses a method of empirically determining the concentration of salt in an aqueous surfactant solution which effects the lowest interfacial tension between the surfactant solution and a hydrocarbon phase, then employing the optimum concentration of salt when the surfactant solution is employed adjacent the hydrocarbon phase. Of primary interest is the use of a surfactant solution in waterflooding to recover oil from a subterranean formation. The optimum concentration of salt, sodium chloride for all practical purposes, is determined to effect the lowest interfacial tension between the surfactant solution and the oil. The optimum concentration of sodium chloride is employed in an aqueous surfactant solution used to displace oil within the subterranean formation. The optimum concentration of sodium chloride may also be employed in washing oil films from solid surfaces such as washing crude oil from bulkheads, pipelines, or storage vessels.

Background of the invention

This invention pertains to a method of lowering interfacial tension between an aqueous phase and a hydrocarbon phase.

The interfacial tension between an aqueous phase and a hydrocarbon phase is lowered for many and widely diverse purposes. Illustrative uses where interfacial tension between an aqueous phase and a hydrocarbon phase is lowered are: (1) cleansing, with aqueous solutions, of hydrocarbons or hydrocarbonaceous films from transportation vehicles, storage tanks, or other articles, and (2) recovering oil from oil-containing subterranean formations by a supplemental recovery process called waterflooding. Typically, the interfacial tension between an aqueous phase and a hydrocarbon phase may range from about 5 to about 50 dynes per centimeter. For example, the interfactial tension between water and hexadecane is about 50 dynes per centimeter. In the past, the surfactants commercially available have lowered this interfacial tension down to about 1 dyne per centimeter. Specific petroleum sulfonates have been described which effect an interfacial tension of the same order of magnitude. A much lower interfacial tension is needed between the aqueous phase and the hydrocarbon phase for several purposes, particularly those enumerated above. As the interfacial tension gets near 1 dyne per centimeter, further improvements have consistently been difficult to achieve.

Summary of the invention

Basically, the invention is a method of producing a minimum interfacial tension between an aqueous phase and a hydrocarbon phase in a particular application by delineating the optimum salinity, composition of surfactant, and concentration of surfactant in the aqueous phase which will effect the minimum interfacial tension and employing that composition and concentration of surfactant and that salinity in the aqueous phase.

In accordance with one embodiment of the invention, there is provided a method of recovering oil from an oil-containing subterranean formation having at least one injection well and at least one production well which comprises the steps of: (a) dissolving a sufficient concentration of a water-soluble surfactant in substantially pure water to form a surfactant solution which will have an interfacial tension with the oil of less than about 0.1 dyne per centimeter; (b) placing a quantity of this surfactant solution adjacent the oil and measuring the interfacial tension therebetween; (c) adding a known quantity of monovalent salt to afford a known concentration of monovalent salt in the surfactant solution, and repeating step (b); (d) repeating step (c); (e) plotting the interfacial tensions obtained in steps (b), (c), and (d) against the concentrations of monovalent salt therein to delineate the optimum concentration of monovalent salt which effects the minimum interfacial tension between the surfactant solution and the oil; (f) preparing a slug of flooding water containing the concentration of the water-soluble surfactant step (a), and containing the optimum concentration of monovalent salt which affords the minimum interfacial tension delineated in step (e); (g) injecting through the injection well and into the subterranean formation the slug of flooding water of step (f); (h) injecting flooding water through the injection well and into the subterranean formation; and (i) producing oil from the production well to the surface of the earth.

In accordance with another embodiment of the invention, there is provided a method of recovering oil from an oil-containing subterranean formation having at least one injection well and at least one production well which comprises the steps of (a) placing a quantity of flooding water to be employed for recovering oil from the subterranean formation adjacent a sample of oil from the formation and measuring the interfacial tension therebetween; (b) dissolving a known quantity of a surfactant having a known composition in the flooding water in a concentration to form a surfactant solution which will have an interfacial tension with the oil of less than about 0.1 dyne per centimeter and repeating step (a); (c) repeating step (b) employing a different surfactant of known composition; (d) repeating step (c) at least once; (e) varying the concentration of the surfactant which afforded the minimum interfacial tension in steps (b), (c), and (d) and measuring the interfacial tension between the surfactant solution and a sample of the oil from the formation for each concentration of surfactant; (f) preparing a slug of flooding water containing the surfactant which affords the minimum interfacial tension and in the concentration giving the minimum interfacial tension for this surfactant; (g) injecting through the injection well and into the subterranean formation the slug of flooding water of step (f); (h) injecting flooding water through the injection well and into the subterranean formation; and (i) producing oil from the production well to the surface of the earth.

Description of specific embodiments

The term "monovalent salt" is employed herein to mean a water-soluble salt which contains monovalent cations. It is meant to exclude salts having multivalent cations such as calcium and magnesium with which the surfactants are not ordinarily compatible. The largest group of soluble monovalent salts are the alkali metal halides. Of all of the alkali metal cations, the sodium ion is the most economical and ordinarily will be employed in the practical salt. Similarly, of all the halides, the chloride is the most economical and ordinarily will be employed in the practical salt. Thus sodium chloride is the practical salt which will be employed as the monovalent salt. Additionally, sodium chloride is the salt in greatest concentration in the brines ordinarily employed as flooding water in recovering oil from a subterranean formation.

The interfacial tension can be measured by employing a sessile drop of the surfactant solution in the hydrocarbon phase where the hydrocarbon phase transmits light. Alternatively, a pendant drop of the hydrocarbon phase may be employed in the surfactant solution to determine the interfacial tension. The method of determining interfacial tension by sessile drop measurements has been described in published references and it is not believed necessary to describe the details here. As the lower interfacial tensions are achieved, it frequently is necessary to employ a magnifying instrument, such as microscopic lenses, to obtain accurate measurements of the dimensions of the drop. Other methods of determining the low interfacial tensions often effected and affording comparative bases may be employed. For example, the DuNouy Tensiometer may be employed to determine the interfacial tension between the aqueous phase and the hydrocarbon phase. However, only the newer models of the most sensitive DuNouy Tensiometers will afford accurate measurements of the low interfacial tensions effected as the concentration of monovalent salt nears the optimum.

Where the salt concentration providing the minimum interfacial tension for any given surfactant is determined, three determinations of interfacial tension as a function of monovalent salt concentration may be adequate to bracket the minimum interfacial tension and approximate the optimum monovalent salt concentration, often referred to as "optimum salinity," for the surfactant in a given application. Where the increases in concentration of monovalent salt are small and the refinement of the resulting data is improved, it may be desirable and necessary to make additional determinations of interfacial tension as a function of monovalent salt concentration in order to bracket the optimum salinity.

Where the particular surfactant in the concentration required to provide a minimum interfacial tension for any given brine to be employed as the flooding water is to be determined, the interfacial tension for as many surfactants as desired may be determined. In these determinations, the concentration of each surfactant in the solutions wherein the interfacial tensions are measured may be the same. Having ascertained a particular surfactant giving, for the concentration employed, a minimum interfacial tension, the concentration of the particular surfactant is varied and the interfacial tension as a function of surfactant concentration is determined. Three or more of such determinations may be adequate to bracket the minimum interfacial tension and approximate the optimum surfactant concentration.

One of the most significant applications in which it is desirable to lower interfacial tension between an aqueous phase and a hydrocarbon phase is in waterflooding a subterranean formation to recover oil therefrom. In waterflooding, water is injected through an injection means, comprising one or more wells, into an oil-containing subterranean formation as a supplemental source of energy to help produce oil therefrom. As is well known, the oil accumulated in a subterranean formation is produced to the surface of the earth through production means, comprising one or more wells drilled from the surface, employing formation energy. When only formation energy is employed in producing operations, much of the oil is not recovered from the subterranean formation. One of the most widely used techniques to supplement formation energy and to recover additional oil is the injection of a fluid through an injection well and into the formation. Oil is displaced from the pores within the formation by the injected fluid and may be produced through a production well to the surface. When, as in waterflooding, the fluid which is injected through the injection well and into the formation is water, it tends to bypass the oil in the relatively restricted pore spaces of the subterranean formation. As a result, the water is produced at the production well before the desired amount of oil has been displaced from within the subterranean formation and produced from the production means.

Recovery of oil by the flooding water is increased by incorporating an additive to lower the interfacial tension between the flooding water and the in-situ oil. Surfactants are employed as the additive to lower the interfacial tension. In general, the lower the interfacial tension, the less the bypassing of the oil and thus the more nearly complete recovery of oil that may be effected by waterflooding.

An surfactant which will effect an interfacial tension between the surfactant solution as the aqueous phase and the hydrocarbon phase of less than about 0.1 dyne per centimeter can be employed. Illustrative of suitable surfactants are the alkyl aryl poly(ethoxy)ethanols in which the alkyl aryl groups impart an oil solubility slightly greater than the water solubility imparted by the poly(ethoxy)ethanol groups. Satisfactory surfactants from this group include octyl or nonyl phenol having an average of 4 to 6 ethoxy groups in the poly(ethoxy) group. Other suitable surfactants include the long chain alkyl sulfonates and the alkyl aryl sulfonates. Preferred surfactants are restricted mixtures of petroleum sulfonates, natural or synthetic, having a medium molecular weight of from about 375 to about 430, having molecular weights between 290 and 590, no more than 10 percent by weight having an average molecular weight less than 290, and no more than 15 percent by weight having an average molecular weight greater than 590. Hereinafter, the petroleum sulfonates described above are referred to by the term "the restricted petroleum sulfonates." Particularly preferred surfactants are the restricted petroleum sulfonates having a medium molecular weight of from about 400 to about 430 and otherwise having the molecular weight distribution of the petroleum sulfonates outlined above. These particularly preferred petroleum sulfonates are referred to herein as "the preferred restricted petroleum sulfonates."

The molecular weights referred to above and hereinafter in connection with petroleum sulfonates are those of the sodium salts. Moreover, the term "molecular weight" should be understood to mean equivalent weight, which is defined as molecular weight per sulfonate group. The term "molecular weight" is used because it is commonly applied by manufacturers of petroleum sulfonates in describing their products.

A concentration of surfactant is employed, as mentioned, which will effect an interfacial tension of less than 0.1 dyne per centimeter between the aqueous phase and hydrocarbon phase. Generally, a concentration of from about 0.01 to about 25 percent by weight will be sufficient. When the surfactant is employed in flooding water to create a surfactant solution to displace oil within the formation, the concentration of surfactant will depend upon the volume of surfactant solution which is injected into the subterranean formation. An amount of surfactant sufficient to satisfy the major part of adsorption site demands of the subterranean formation will ordinarily be required for an effective surfactant solution displacement of the oil within the subterranean formation. Thus, where a slug size of less than 0.1 pore volume of surfactant solution is employed, a concentration of surfactant therein greater than 10 percent by weight may be employed. It is preferred to inject a surfactant solution that is below saturation concentration at the reservoir conditions.

Ordinarily, a slug of flooding water containing the surfactant will be from about 0.01 to about 0.2 of the pore volume of the subterranean formation to be flooded.

If desired, a slug of water having the same concentration as the practical monovalent salt, of sodium chloride as the slug of flooding water contaning the surfactant, may be injected ahead of the slug of flooding water containing the surfactant. Further, where the composition and concentration of the surfactant is tailored to the brine employed as the flooding water, a slug of water containing the optimum concentration of sodium chloride may be injected behind the slub of flooding water containing the surfactant and containing the optimum concentration of sodium chloride. The interpositioning of these slugs of water containing the optimum concentration of sodium chloride will prevent contamination of the slug of flooding water containing the surfactant by the connate water in the formation and by the flooding water where its salt concentration is different from that of the slug of flooding water containing the surfactant.

The following examples will be further illustrative of the invention.

Example 1

This example illustrates the optimum concentration of sodium chloride in a simple system of an aqueous solution of surfactant against normal hexadecane at 25° C.

In this example, a concentration of 0.01 percent by weight of Alconate 80, a commercially available product containing 80 percent by weight of a mixture of petroleum sulfonates having molecular weights up to 590 and having a median molecular weight of about 418, was dissolved in distilled water. Varying amounts of sodium chloride were incorporated into aliquots of the solution of surfactant and the interfacial tensions of these aliquots against normal hexadecane were measured at 25° C. The data are summarized in Table 1.

TABLE I

| Sodium chloride, weight percent | Interfacial tension, dynes per centimeter |
|---|---|
| 0 | 12.0 |
| 0.1 | 4.4 |
| 0.2 | 3.5 |
| 0.5 | 0.1 |
| 2.5 | 0.025 |
| 5.0 | 0.8 |

Table I illustrates the initial interfacial tension of 12.0 dynes per centimeter, which was achieved with the relatively low concentration of surfactant, was decreased to 0.025 dyne per centimeter at the optimum concentration of sodium chloride of 2.5 percent by weight. In contrast, when the concentration of sodium chloride was increased to about 5 percent, the interfacial tensions increased to about 0.8 dyne per centimeter.

Example 2

The following example illustrates obtention of a minimum interfacial tension by mixing an oil field brine and an oil field fresh water to form a flooding water having a given concentration of surfactant, as measured against the oil from the field. In this example, the oil was the crude oil from the Upper Upper Loma Novia Sand, Loma Novia Field, Duval County, Texas. The reservoir temperature is 116° F. (46° C.) and, hence, interfacial tensions were measured at this temperature. Table II shows the composition of the oil field brine and the oil field fresh water.

TABLE II

| Brine | Component, p.p.m. | Fresh water |
|---|---|---|
| 0 | $CO_3^-$ | 2 |
| 1,382 | $HCO_3^-$ | 281 |
| 0 | $SO_4^-$ | 186 |
| 6,057 | $Cl^-$ | 142 |
| 0 | $Ba^{++}$ | |
| 0 | Fe, dissolved | 0 |
| 2.8 | Fe, total | 2.1 |
| 28 | $Ca^{++}$ | 20 |
| 8 | $Mg^{++}$ | 20 |
| 4,500 | $Na^+$ (flame) | 250 |
| 11,020 | Total dissolved solids | 776 |
| 1.009 | Sp. gr | 1.000 |
| 7.7 | pH | 8.3 |

When the brine was placed in contact with, i.e., adjacent, the crude oil, an interfacial tension of 6.8 dynes per centimeter was observed.

A series of flooding waters was prepared by mixing the brine in various proportions with the fresh water. Essentialy a brine containing about 1.1 percent salt was mixed with fresh water containing less than 0.1 percent salt. Into the flooding waters was incorporated adequate Alconate 80 and Pyronate 50, a commercially available product containing 50 percent by weight of a mixture of petroleum sulfonates having molecular weight as low as 290 and having a median molecular weight of about 346 to afford a concentration in the final surfactant solution of .08 percent by weight Alconate 80 and .0004 percent by weight Pyronate 50. Into the flooding waters were also incorporated 0.05 percent by weight sodium carbonate and 0.1 percent by weight sodium tripolyphosphate since these additives had been found to reduce adsorption onto subterranean formation surfaces. Interfacial tension measurements were made as described hereinbefore between the crude oil and the flooding waters containing the surfactant and the various proportions of brine and fresh water. Interfacial tension measurement was also made between the crude oil and the brine containing the surfactant. The results are given in Table III. In the table, the first column is the volume percent of the brine in the flooding water.

TABLE III

| Brine, volume percent | Interfacial tension, dynes per centimeter |
|---|---|
| 20 | .01 |
| 40 | .0035 |
| 60 | .0035 |
| 80 | .0045 |
| 100 | .008 |

Table III indicates that an optimum salinity is achieved by mixing 40–60 percent brine with about 50 percent fresh water. Thus, an optimum salt concentration of about 0.6 percent by weight effects the minimum interfacial tension between the flooding water and the crude oil at the reservoir temperature of 46° C.

What is claimed is:

1. The method of recovering oil from a subterranean formation containing oil and having at least one injection well and at least one production well, in which method an aqueous, saline solution containing a surfactant is injected through an injection well into said subterranean formation and thereafter flooding water is injected through said injection well into said subterranean formation, the steps comprising:

(a) dissolving a sufficient concentration of a water-soluble surfactant in substantially pure water to form a surfactant solution which will have an interfacial tension between said oil contained in said subterranean formation of less than about 0.1 dyne per centimeter, (b) placing a quantity of said surfactant solution adjacent a sample of said oil contained in said subterranean formation and measuring the interfacial tension therebetween, (c) adding a known quantity of sodium chloride to said surfactant solution to afford a known concentration of sodium chloride in said surfactant solution and repeating step (b), (d) repeating step (c) at least twice, (e) plotting said interfacial tension obtained in steps (b), (c), and (d) against said concentrations of sodium chloride therein to delineate the optimum concentration of sodium chloride giving the minimum interfacial tension between said surfactant solution and said oil, (f) preparing a slug of water containing said concentration of said water-soluble surfactant in step (a), and containing said optimum concentration of sodium chloride giving the minimum interfacial tension as delineated in step (e), (g) injecting through an injection well into said subterranean formation said slug of water of step (f), (h) where said flooding water has a concentration of sodium chloride different from that of said slug of water of step (f), injecting a slug of water containing said concentration of sodium chloride giving the minimum interfacial tension as delineated in step (e) behind said slug of water containing said surfactant of step (g), (i) thereafter injecting said flooding water through said injection well into said subterranean formation, and (j) producing oil from a production well to the surface of the earth.

2. The method of recovering oil from a subterranean formation containing oil and containing interstitial water and having at least one injection well and at least one injection well and at least one production well, in which method a aqueous, saline solution containing a surfactant is injected through an injection well into said subterranean formation and thereafter flooding water is injected through said injection well into said subterranean formation, the steps comprising:

(a) dissolving a sufficient concentration of a water-soluble surfactant in substantially pure water to form a surfactant solution which will have an interfacial tension between said oil contained in said subterranean formation of less than about 0.1 dyne per centimeter, (b) placing a quantity of said surfactant solution adjacent a sample of said oil contained in said subteranean formation and measuring the interfacial tension therebetween, (c) adding a known quantity of sodium chloride to said surfactant solution to afford a known concentration of sodium chloride in said surfactant solution and repeating step (b), (d) repeating step (c) at least twice, (e) plotting said interfacial tension obtained in steps (b), (c), and (d) against said concentrations of sodium chloride therein to delineate the optimum concentration of sodium chloride giving the minimum interfacial tension between said surfactant solution and said oil, (f) preparing a slug of water containing said concentration of said water-soluble surfactant in step (a), and containing said optimum concentration of sodium chloride giving the minimum interfacial tension as delineated in step (e), (g) where said interstitial water contained in said subterranean formation has a concentration of sodium chloride different from that of said solution giving the minimum interfacial tension as delineated in step (e), injecting a slug of water containing said concentration of sodium chloride giving the minimum interfacial tension as delineated in step (e) through said injection well into said subterranean formation, (h) thereafter injecting through said injection well into said subterranean formation said slug of water of step (f), (i) injecting flooding water through said injection well into said subterranean formation, and (j) producing oil from a production well to the surface of the earth.

3. The method of recovering oil from a subterranean formation containing oil and containing interstitial water and having at least one injection well and at least one production well, in which method an aqueous saline solution containing a surfactant is injected through an injection well into said subterranean formation and thereafter flooding water is injected through said injection well into said subterranean formation, the steps comprising:

(a) placing a quantity of water containing sodium chloride adjacent a sample of said oil contained in said subterranean formation, (b) dissolving a known quantity of a surfactant having a known composition in said water in a concentration to form a surfactant solution which will have an interfacial tension with said oil of less than about 0.1 dyne per centimeter, (c) measuring the interfacial tension between said solution and said oil, (d) repeating steps (a), (b), and (c), employing a different surfactant of known composition, (e) repeating step (d) at least once, (f) varying the concentration of the surfactant giving the minimum interfacial tension in steps (c), (d), and (e) and the concentration of the sodium chloride in the solution thereof and measuring the interfacial tension between said surfactant solution and a sample of said oil contained in said subterranean formation for each concentration of surfactant and sodium chloride in the solution thereof, (g) preparing a slug of water containing said surfactant and sodium chloride and in the concentration giving the minimum interfacial tension as delineated in step (f), (h) where said interstitial water contained in said subterranean formation has a concentration of sodium chloride different from that of said slug of water containing said surfactant and sodium chloride of step (g), injecting through an injection well into said subterranean formation a slug of water having the same concentration of sodium chloride as that of said slug of water of step (g), (i) thereafter injecting through said injection well into said subterranean formation said slug of water of step (g), (j) thereafter injecting said flooding water through said injection well into said subterranean formation, and (k) producing oil from a production well to the surface of the earth.

4. The method of recovering oil from a subterranean formation containing oil and having at least one injection well and at least one production well, in which method an aqueous, saline solution containing a surfactant is injected through an injection well into said subterranean formation and thereafter flooding water is injected through said injection well into said subterranean formation, the steps comprising:

(a) determining the salinity and the concentration of surfactant in said aqueous, saline solution containing said surfactant to give the minimum interfacial tension, and interfacial tension being less than about 0.1 dyne per centimeter, between said aqueous, saline solution containing said surfactant and said oil contained in said subterranean formation.

(b) preparing a slug of water having the same salinity and the same concentration of said surfactant as the solution giving the minimum interfacial tension as delineated in step (a), (c) injecting through an injection well into said subterranean formation said slug of water of step (b), (d) where said flooding water has a different salinity than said slug of water of step (b), injecting through said injection well into said subterranean formation behind said slug of water of step (c) a slug of water having the same salinity as said aqueous, saline solution containing said surfactant giving the minimum interfacial tension as delineated in step (a), (e) thereafter injecting said flooding water through said injection well into said subterranean formation, and (f) producing oil from a production well to the surface of the earth.

5. The method of recovering oil from a subterranean formation containing oil and containing interstitial water and having at least one injection well and at least one production well, in which method an aqueous, saline solution containing a surfactant is injected through an injection well into said subterranean formation and thereafter flooding water is injected through said injection well into said subterranean formation, the steps comprising:
(a) determining the salinity and the concentration of surfactant in said aqueous, saline solution containing said surfactant to give the minimum interfacial tension, said interfacial tension being less than about 0.1 dyne per centimeter, between said aqueous, saline solution containing said surfactant and said oil contained in said subterranean formation,
(b) preparing a slug of water having the same salinity and the same concentration of said surfactant as the solution giving the minimum interfacial tension as delineated in step (a),
(c) where said interstitial water contained in said subterranean formation has a salinity different from the salinity of said solution giving the minimum interfacial tension as delineated in step (a), injecting through said injection well into said subterranean formation a slug of water having the same salinity as said solution giving the minimum interfacial tension as delineated in step (a),
(d) thereafter injecting through said injection well into said subterranean formation said slug of water of step (b),
(e) thereafter injecting said flooding water through said injection well into said subterranean formation, and
(f) producing oil from a production well to the surface of the earth.

References Cited

UNITED STATES PATENTS

| | | | |
|---|---|---|---|
| 2,882,973 | 4/1959 | Doscher et al. | 166—9 X |
| 3,302,713 | 2/1967 | Ahearn et al. | 166—9 |
| 3,346,047 | 10/1967 | Townsend et al. | 166—9 |
| 3,348,611 | 10/1967 | Reisberg | 166—9 |
| 3,369,602 | 2/1968 | Fallgatter et al. | 166—9 |
| 3,371,710 | 3/1968 | Harvey et al. | 166—9 |
| 3,373,808 | 3/1968 | Patton | 166—9 |

STEPHEN J. NOVOSAD, Primary Examiner

U.S. Cl. X.R.

166—273, 274

UNITED STATES PATENT OFFICE
CERTIFICATE OF CORRECTION

Patent No. 3,467,190                              Dated September 16, 1969

Inventor(s)   Peggy M. Dunlap et al.

It is certified that error appears in the above-identified patent and that said Letters Patent are hereby corrected as shown below:

Column 1, line 50, "interfactial" should read --interfacial--. Column 2, line 20, after "surfactant" inser --in--. Column 4, line 13, "An" should read --Any--; line 74 "contaning" should read --containing--. Column 5, line 5, "slub" should read --slug--; line 36, "3,5" should read --3.5 Column 7, line 20, delete "injection well and at least one"; line 21, after "method", "a" should read --an--. Column 8, line 51, "and" should read --said--.

SIGNED AND
SEALED
MAY 5 1970

(SEAL)
Attest:

Edward M. Fletcher, Jr.
Attesting Officer

WILLIAM E. SCHUYLER, JR.
Commissioner of Patents